US010901356B2

(12) United States Patent
Mitsui

(10) Patent No.: US 10,901,356 B2
(45) Date of Patent: Jan. 26, 2021

(54) IMAGE-FORMING APPARATUS AND RECORDING MATERIAL IDENTIFICATION UNIT

(71) Applicant: CANON KABUSHIKI KAISHA, Tokyo (JP)

(72) Inventor: Yuji Mitsui, Susono (JP)

(73) Assignee: Canon Kabushiki Kaisha, Tokyo (JP)

( * ) Notice: Subject to any disclaimer, the term of this patent is extended or adjusted under 35 U.S.C. 154(b) by 120 days.

(21) Appl. No.: 16/113,935

(22) Filed: Aug. 27, 2018

(65) Prior Publication Data

US 2019/0064718 A1 Feb. 28, 2019

(30) Foreign Application Priority Data

Aug. 31, 2017 (JP) ................. 2017-167759

(51) Int. Cl.
| | | |
|---|---|---|
| G03G 15/00 | (2006.01) | |
| G01B 11/10 | (2006.01) | |
| B65H 7/14 | (2006.01) | |
| B65H 5/36 | (2006.01) | |
| B65H 7/20 | (2006.01) | |
| G01B 21/08 | (2006.01) | |

(52) U.S. Cl.
CPC .......... *G03G 15/5029* (2013.01); *B65H 5/36* (2013.01); *B65H 7/14* (2013.01); *B65H 7/20* (2013.01); *G01B 11/105* (2013.01); *G03G 15/6502* (2013.01); *B65H 2404/6111* (2013.01); *B65H 2511/414* (2013.01); *B65H 2511/416* (2013.01); *B65H 2553/30* (2013.01); *B65H 2553/414* (2013.01); *B65H 2553/81* (2013.01); *B65H 2801/06* (2013.01); *G01B 21/08* (2013.01)

(58) Field of Classification Search
CPC .................................................. G03G 15/5029
USPC .......................................................... 399/389
See application file for complete search history.

(56) References Cited

U.S. PATENT DOCUMENTS

| | | | | |
|---|---|---|---|---|
| 5,125,642 A | * | 6/1992 | Orsinger ................ | B43M 3/045 |
| | | | | 271/262 |
| 8,340,563 B2 | * | 12/2012 | Nakajima ................ | B65H 7/02 |
| | | | | 399/389 |
| 2003/0016959 A1 | * | 1/2003 | Fujikura ................ | G01B 21/08 |
| | | | | 399/45 |

(Continued)

FOREIGN PATENT DOCUMENTS

| | | |
|---|---|---|
| JP | 2007277011 A | 10/2007 |
| JP | 2014238504 A | 12/2014 |
| JP | 2015009964 A | 1/2015 |

*Primary Examiner* — Anthony H Nguyen
(74) *Attorney, Agent, or Firm* — Canon U.S.A., Inc., IP Division

(57) ABSTRACT

A detection unit includes a first contact member that comes into contact with a surface of a recording material and a second contact member that comes into contact with the other surface of the recording material, and the first contact member and the second contact member face each other and are capable of nipping the recording material. The first contact member and the second contact member are movable in a direction in which the first contact member and the second contact member nip the recording material. The first contact member and the second contact member are rotatable about an axial line that extends in a direction in which the recording material is conveyed.

20 Claims, 10 Drawing Sheets

(56) References Cited

U.S. PATENT DOCUMENTS

| | | | |
|---|---|---|---|
| 2003/0235448 A1* | 12/2003 | Nemura | G03G 15/5029 399/389 |
| 2006/0056861 A1* | 3/2006 | Nojima | G03G 15/6567 399/16 |
| 2007/0234582 A1* | 10/2007 | Kondo | G01B 11/0691 33/501.04 |
| 2008/0187343 A1* | 8/2008 | Yamaguchi | G03G 15/5054 399/74 |
| 2009/0136246 A1* | 5/2009 | Murakami | G03G 15/5029 399/45 |
| 2013/0200565 A1* | 8/2013 | Takenaka | B65H 7/02 271/273 |
| 2014/0015192 A1* | 1/2014 | Wakabayashi | B65H 7/20 271/110 |

* cited by examiner

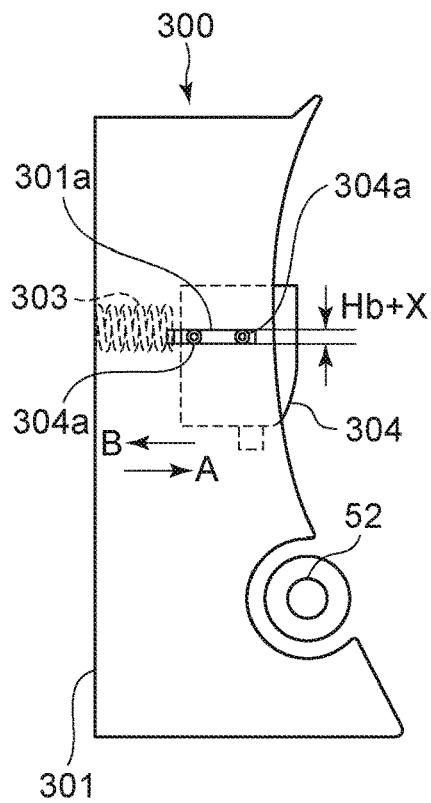
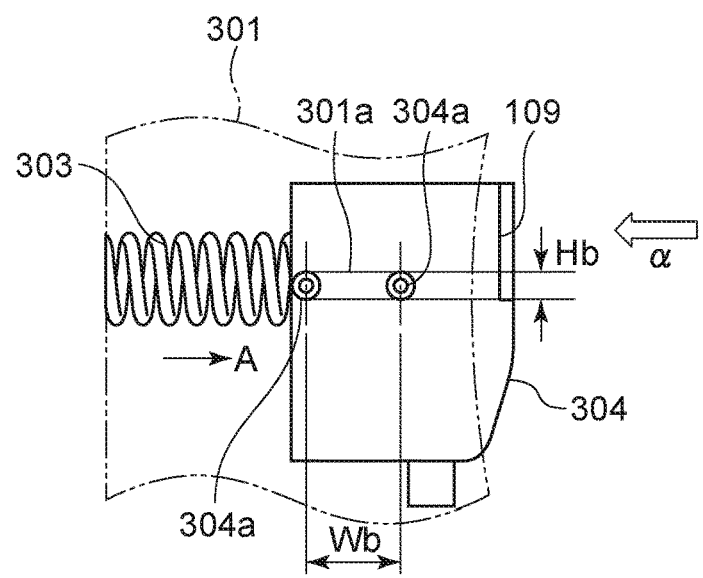
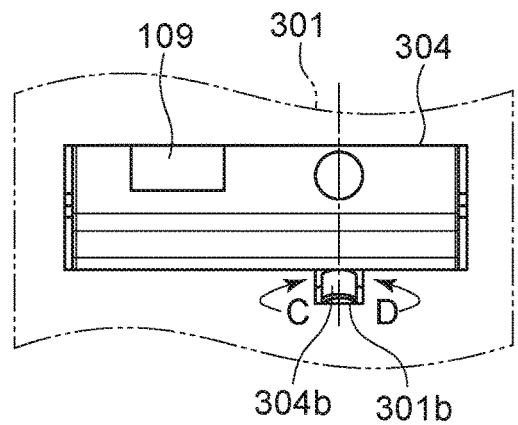
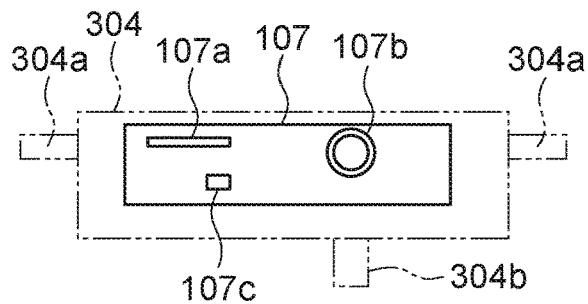
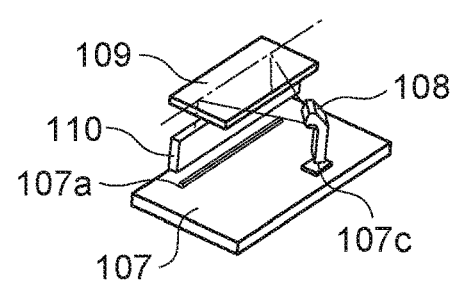

IMAGE-FORMING APPARATUS AND RECORDING MATERIAL IDENTIFICATION UNIT

BACKGROUND OF THE INVENTION

Field of the Invention

The present disclosure relates to the structure of a detection unit that is disposed in an image-forming apparatus or a recording material identification unit and that detects information about characteristics of a recording material.

Description of the Related Art

In recent years, techniques for image-forming apparatuses such as copying machines and printers that support various recording materials have been proposed to set detailed printing conditions in accordance with characteristics of the recording materials. A copying machine and a printer that include sensors for identifying the kind of recording materials to set the printing conditions have also been proposed.

An optical sensor known as one of the sensors for identifying the kind of a recording material includes a light source that faces a surface of the recording material and detects transmitted light that has been transmitted through the recording material to find the thickness of the recording material. Another sensor recently proposed detects reflected light that has been reflected from a surface of a recording material to find surface properties of the recording material. Another one uses ultrasonic waves to find the basis weight of the recording material.

In Japanese Patent Laid-Open No. 2015-009964, a sensor that detects transmitted light as described above is disclosed. The sensor is disposed on a conveyance path for a recording material. The recording material is interposed between two contact members when being conveyed. One of the contact member includes a light source. The other contact member includes a light-receiving element. The two contact members are urged against the surfaces of the recording material by using springs, With this structure, the sensor more successfully follows the recording material, and the thickness of the recording material can be detected with higher precision.

With the structure in Japanese Patent Laid-Open No. 2015-009964, however, a rigid recording material with a width corresponding to the width of the conveyance path inclines in the thickness direction of the recording material when the sensor is located at a position at which the conveyance path curves. This causes the contact members to be separated from the surfaces of the recording material, and the sensor does not successfully follow the recording material. Consequently, the precision of detection with the sensor decreases. A measure that can be considered against this is to increase pressing forces of the springs that urge the contact members to such a degree that the pressing forces surpass the rigidity of the recording material. In some cases, however, the front edge of a recording material that is not rigid cannot enter a sensor nip portion that is defined by the two contact members. In some cases, when the rear edge of the recording material is extracted from the sensor nip portion, the recording material gets a big shock, and this affects image formation. The structure disclosed in Japanese Patent Laid-Open No. 2015-009964 supported a wide variety of recording materials at that time. In recent years, however, the kind of the recording materials has increased, and there is a need for a sensor that more successfully follows the recording materials.

SUMMARY OF THE INVENTION

The present disclosure provides an image-forming apparatus or a recording material identification unit with a sensor that more successfully follows the recording materials.

The present disclosure provides an image-forming apparatus including an image-forming unit that forms an image on a recording material, a detection unit that detects information about a characteristic of the recording material, and a control unit that sets an image formation condition of the image-forming unit on a basis of the information about the characteristic of the recording material that is detected by the detection unit. The detection unit includes a first contact member that comes into contact with a surface of the recording material and a second contact member that comes into contact with the other surface of the recording material, and the first contact member and the second contact member face each other and are capable of nipping the recording material. The first contact member and the second contact member are movable in a direction in which the first contact member and the second contact member nip the recording material. The first contact member and the second contact member are rotatable about an axial line that extends in a direction in which the recording material is conveyed.

The present disclosure provides a recording material identification unit including a detection unit that detects information about a characteristic of a recording material, and a control unit that identifies a kind of the recording material on a basis of the information about the characteristic of the recording material that is detected by the detection unit. The detection unit includes a first contact member that comes into contact with a surface of the recording material and a second contact member that comes into contact with the other surface of the recording material, and the first contact member and the second contact member face each other and are capable of nipping the recording material. The first contact member and the second contact member are movable in a direction in which the first contact member and the second contact member nip the recording material. The first contact member and the second contact member are rotatable about an axial line that extends in a direction in which the recording material is conveyed.

Further features of the present disclosure will become apparent from the following description of exemplary embodiments with reference to the attached drawings.

BRIEF DESCRIPTION OF THE DRAWINGS

FIGS. 2A to 2E illustrate the stricture of a sensor guide unit according to the embodiment.

DESCRIPTION OF THE EMBODIMENTS

An embodiment for carrying out the present disclosure will hereinafter be described in detail by way of example with reference to the drawings and examples. The dimensions, materials, shapes, relative positions, and so on of components described according to the embodiment ought to be appropriately changed in accordance with the structures and various conditions of apparatuses for which the invention is used. The scope of the present invention is not limited to the embodiment described below.

Embodiment

Description of Overall Structure

Figure 1:
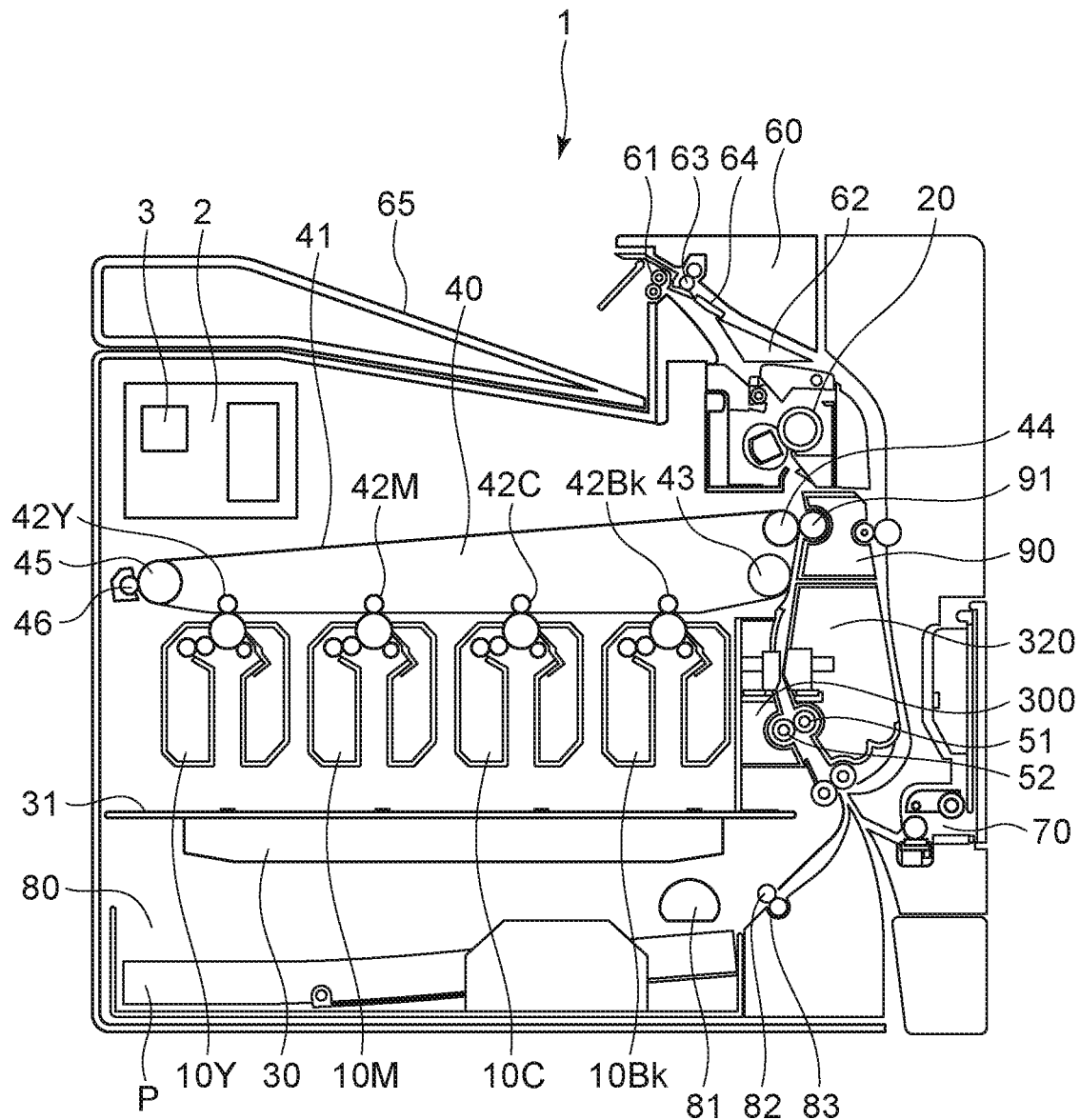
FIG. 1 is a sectional view of the overall structure of a full color laser beam printer according to an embodiment.

An overview of the overall structure of an image-forming apparatus I will be described with reference to FIG. 1. FIG. 1 is a sectional view of the overall structure of a full color laser beam printer that corresponds to the image-forming apparatus according to the present embodiment. The image-forming apparatus illustrated in FIG. 1 includes a cassette sheet-feeding unit 80 on the bottom and a manual sheet-feeding unit 70 on the right-hand side assuming that a user faces a surface on which four process cartridges described later are disposed, A registration roller 51 and an opposing registration roller 52 for adjusting the position of a front edge of a recording material P and conveying the recording material P are disposed above the cassette sheet-feeding unit 80. Similarly, a laser scanner unit 30 that forms electrostatic latent images on photosensitive members is disposed above the cassette sheet-feeding unit 80. A scanner frame 31 is disposed right above the laser scanner unit 30. The laser scanner unit 30 is secured to the scanner frame 31. A sensor guide unit 300 is disposed near the registration roller 51 and the opposing registration roller 52. Four process cartridges 10 (10Y, 10M, 10C, and 10Bk) are disposed above the scanner frame 31, An intermediate transfer unit 40 is disposed above the process cartridges 10 (10Y, 10M, 10C, and 10Bk) and faces the process cartridges 10 (10Y, 10M, 10C, and 10Bk). The intermediate transfer unit 40 includes an intermediate transfer belt 41, and includes primary transfer rollers 42 (42Y, 42M, 42C, and 42Bk), a drive roller 43, an opposing secondary transfer roller 44, and a tension roller 45 inside the intermediate transfer belt 41 and a cleaning device 46 outside the intermediate transfer belt 41.

A secondary transfer unit 90 is disposed on the right-hand side of the intermediate transfer unit 40. The secondary transfer unit 90 includes a secondary transfer roller 91 (transfer portion) that faces the opposing secondary transfer roller 44. A secondary-transfer-side sensor unit 320 faces the sensor guide unit 300. The secondary transfer unit 90 and the secondary-transfer-side sensor unit 320 may be integrally formed. A fixing unit 20 (fixing portion) is disposed above the intermediate transfer unit 40 and the secondary transfer unit 90. A sheet-discharging unit 60 is disposed at the upper left of the fixing unit 20. The sheet-discharging unit 60 includes a pair of discharge rollers 61, a duplex conveying section 62, a pair of reverse rollers 63, and a duplex flapper 64 that serves as a branch unit. An image formation controller 2 includes a CPU 3 and collectively controls image formation operation of the image-forming apparatus 1.

Description of Print Operation

When print data including print instructions and image information is inputted into the image formation controller 2 from, for example, a host computer not illustrated, the image-forming apparatus 1 starts print operation. The recording material P is fed from the cassette sheet-feeding unit 80 to a conveyance path by using a feed roller 81, a conveyance roller 82, and an opposing conveyance roller 83. During first image formation, the recording material P is nipped between the registration roller 51 and the opposing registration roller 52 and stopped once in this state in front of the secondary transfer roller 91 to convey the recording material P in synchronism with formation of an image on the intermediate transfer belt 41. The conveyance is waited until the image is formed, and then, the recording material P is conveyed. Successive recording materials P is not stopped once but are continuously conveyed. Developer images of respective colors that are developed by the process cartridges (10Y, 10M, 10C, and 10Bk) are transferred to the intermediate transfer belt 41 in order in synchronism with the conveyance of the recording material P. The developer images (color images) that are developed and stacked on the intermediate transfer belt 41 move to the opposing secondary transfer roller 44 together with the intermediate transfer belt 41. The conveyance of the recording material P that is suspended is resumed when the registration roller 51 and the opposing registration roller 52 rotate. The recording material P enters a transfer nip portion between the secondary transfer roller 91 and the intermediate transfer belt 41 in synchronism with the developer images, and the images are secondary-transferred to the recording material P. A color image that is transferred to the recording material P is heated, pressurized, melted, and fixed to the recording material P by the fixing unit 20 that includes a fixing roller. The recording material P fixed is discharged to a sheet discharge tray 65 by using the pair of discharge rollers 61, This completes color image formation operation. The cleaning device 46 is disposed near the intermediate transfer belt 41, and a cleaning member such as a cleaning blade that is disposed therein scrapes the developer that remains on the intermediate transfer belt to prepare next image formation.

Description of Structure of Sensor Guide Unit

FIGS. 2A to 2F, illustrate the sensor guide unit 300 according to the present embodiment. As illustrated in FIG. 2A, a sensor holder 304 (first contact member) is installed in a conveyance guide 301 (first holding member) that guides the recording material P. The conveyance guide 301 includes a groove 301a, The sensor holder 304 includes two protrusions 304a. The two protrusions 304a are inserted in the groove 301a. The sensor holder 304 is movable along the groove 301a in directions of arrows A and B.

FIG. 2B illustrates the sensor holder 304. As illustrated in FIG. 2B, a spring 303 (first urging member) is disposed between the conveyance guide 301 and the sensor holder 304 and presses the sensor holder 304 in the direction of the arrow A. The width of each protrusion 304a in the height direction is Hb. As illustrated in FIG. 2A, the width of the groove 301a in the height direction is a clearance X wider than the width Hb of the protrusion 304a in the height direction. The clearance X is determined in accordance with a lateral length Wb of a space (distance) between the two protrusions 304a. For example, when the lateral length Wb of the space between the protrusions 304a is 10 mm, and the clearance X is 0.1 mm, one of the protrusions 304a can pivot 1 degree about the other protrusion 304a within the clearance X.

FIG. 2C illustrates the sensor holder 304 viewed from the secondary-transfer-side sensor unit 320, That is, FIG. 2C illustrates the sensor holder 304 viewed in the direction of an arrow a in FIG. 2B. As illustrated in FIG. 2C, the conveyance guide 301 includes a groove 301b, and the sensor holder 304 includes a cylindrical protrusion 304b. The protrusion 304b is inserted in the groove 301b, The sensor holder 304 is movable along the groove 301b in the directions of the arrows A and. B in FIG. 2A. The sensor holder 304 is rotatable in directions of arrows C and D about an axial line that coincides with the center line of the cylindrical protrusion 304b.

FIG. 2D illustrates an internal structure of the sensor holder 304. FIG. 2D illustrates the internal structure of the sensor holder 304 viewed from the secondary-transfer-side sensor unit 320 as in FIG. 2C. In FIG. 2D, a housing and a glass member 109 are omitted to illustrate the internal structure of the sensor holder 304. As illustrated in FIG. 2D, the sensor holder 304 includes a sensor electric board 107 that detects characteristics of the recording material P such as the surface properties and basis weight of the recording material P. A detector of the surface properties includes a line sensor 107a and a LED 107c, and a detector of the basis weight includes an ultrasonic wave receiver 107b. The line sensor 107a, the LED 107c, and the ultrasonic wave receiver 107b are disposed on the sensor electric board 107. When viewed from this direction, the center line of the protrusion 304b passes through the center of the ultrasonic wave receiver 107b.

The line sensor 107a is a light-receiving portion, and the LED 107c is a light-emitting portion. The line sensor 107a and the LED 107c in cooperation with each other serve as the detector of the surface properties that captures an image of a surface of the recording material P to detect the surface properties of the recording material P. The detector of the surface properties will now be described in detail.

FIG. 2E is a perspective view of the detector of the surface properties. Light that is emitted from the LED 107c is polarized by a polarizer 108, passes through the glass member 109 that is transparent, and is incident obliquely on the surface of the recording material P. Light that is reflected from the surface of the recording material P is focused by a focusing element 110, and the image is captured by the line sensor 107a. The line sensor 107a is an imaging element that extends in the direction (width direction of the recording material P) perpendicular to the direction in which the recording material P is conveyed, and captures the image multiple times while the recording material P is conveyed. The CPU 3 calculates characteristic quantities from the image of the surface of the recording material P that is thus obtained, and this enables the surface properties of the recording material P to be detected. Examples of the characteristic quantities include differences between output values of pixels. The CPU 3 determines the recording material has a smooth surface when the differences are small and determines the recording material has a rough surface when the differences are large. The method of detecting the surface properties of the recording material P is not limited thereto. For example, a light-receiving element may be provided instead of the imaging element, and the magnitude of the amount of reflected light that is received by the light-receiving element may be used to detect the surface properties of the recording material P. In this case, the CPU 3 determines the recording material has a smooth surface when the amount of the reflected light is large and determines the recording material has a rough surface when the amount of the reflected light is small.

Description of Structure of Secondary-Transfer-Side Sensor Unit

Figure 3A:
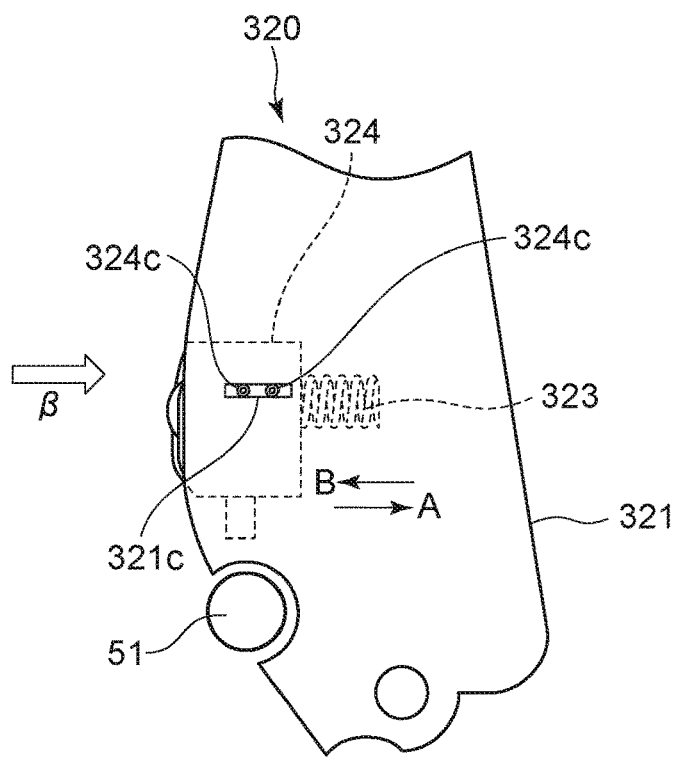
FIGS. 3A to 3C illustrate the structure of a secondary-transfer-side sensor unit according to the embodiment.
Figure 3B:
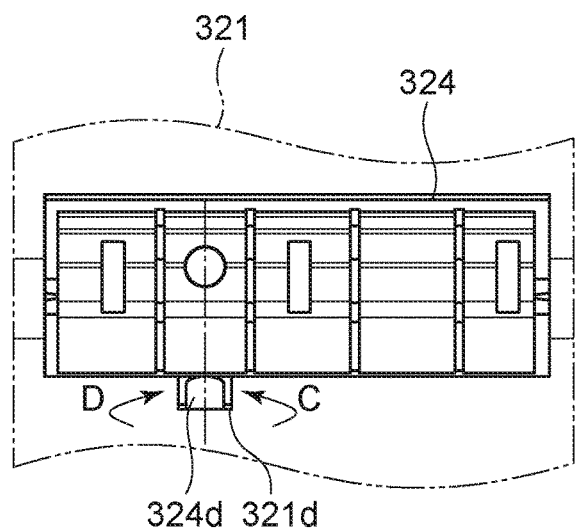
Figure 3C:
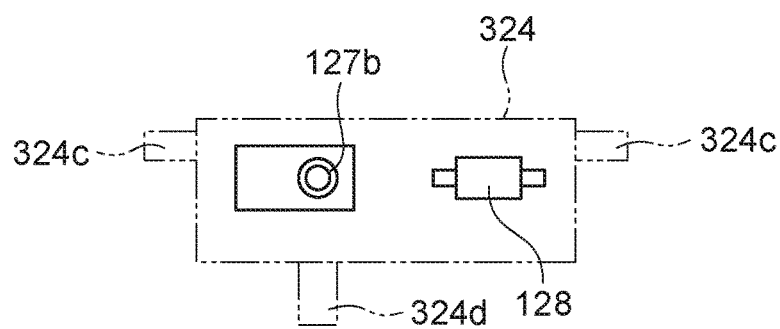

FIGS. 3A to 3C illustrate the secondary-transfer-side sensor unit 320. As illustrated in FIG. 3A, a secondary-transfer-side sensor holder 324 (second contact member) is installed in a secondary-transfer-side conveyance guide 321 (second holding member) that guides the recording material P. The secondary-transfer-side conveyance guide 321 includes a groove 321c. The secondary-transfer-side sensor holder 324 includes two protrusions 324c. The two protrusions 324c are inserted in the groove 321c, The secondary-transfer-side sensor holder 324 is movable along the groove 321c in the directions of the arrows A and B. A spring 323 (second urging member) is disposed between the secondary-transfer-side conveyance guide 321 and the secondary-transfer-side sensor holder 324 and presses the secondary-transfer-side sensor holder 324 in the direction of the arrow B. The width of the groove 321c in the height direction is determined such that the protrusions 324c with a width Hd in the height direction are fitted into the groove 321c. That is, there is substantially no clearance between the groove 321c and the protrusions 324c unlike the case of the sensor guide unit 300.

FIG. 3B illustrates the secondary-transfer-side sensor holder 324 viewed from the sensor guide unit 300. That is, FIG. 3B illustrates the secondary-transfer-side sensor holder 324 viewed from the direction of an arrow β in FIG. 3A. As illustrated in FIG. 3B, the secondary-transfer-side conveyance guide 321 includes a groove 321d, and the secondary-transfer-side sensor holder 324 includes a cylindrical protrusion 324d. The protrusion 324d is inserted in the groove 321d. The secondary-transfer-side sensor holder 324 is movable along the groove 321d in the directions of the arrows A and B in FIG. 3A. The secondary-transfer-side sensor holder 324 is rotatable in the directions of the arrows C and D about an axial line that coincides with the center line of the cylindrical protrusion 324d.

FIG. 3C illustrates an internal structure of the secondary-transfer-side sensor holder 324. FIG. 3C illustrates the internal structure of the secondary-transfer-side sensor holder 324 viewed from the sensor guide unit 300 as in FIG. 3B. In FIG. 3C, a housing is omitted to illustrate the internal structure of the secondary-transfer-side sensor holder 324. As illustrated in FIG. 3C, the secondary-transfer-side sensor holder 324 includes an ultrasonic wave transmitter 127b and a driven roller 128 for detecting the basis weight of the recording material P. The ultrasonic wave transmitter 127b faces the ultrasonic wave receiver 107b that is disposed in the sensor holder 304 with the conveyance path interposed therebetween. When viewed from this direction, the center line of the protrusion 324d passes through the center of the ultrasonic wave transmitter 127b. The driven roller 128 faces the detector of the surface properties that is disposed in the sensor holder 304 with the conveyance path interposed therebetween. The conveyance of the recording material P results in rotation of the driven roller 128. The driven roller 128 presses the recording material P against the glass member 109 that is disposed in the sensor holder 304 so that the recording material P is prevented from fluttering when being conveyed. Consequently, the line sensor 107a can capture an unblurred image of the surface.

The ultrasonic wave transmitter 127b and the ultrasonic wave receiver 107b in cooperation with each other serve as the detector of the basis weight that receives ultrasonic waves that have passed through the recording material P to detect the basis weight of the recording material P. The basis weight is the mass of the recording material P per unit area and represented by [$g/m^2$]. The detector of the basis weight will now be described in detail.

The ultrasonic wave transmitter 127b and the ultrasonic wave receiver 107b have the same structure and each include a piezoelectric element, which is an element for mutual conversion between a mechanical displacement and an electrical signal, and an electrode terminal. In the ultrasonic wave transmitter 127b, when a pulse voltage at a predetermined frequency is applied to the electrode terminal, the piezoelectric element oscillates, and ultrasonic waves are generated and propagate in air. When the ultrasonic waves reach the recording material P, the recording material P vibrates due to the ultrasonic waves. The ultrasonic waves that are generated by the ultrasonic wave transmitter 127b propagate to the ultrasonic wave receiver 107b via the recording material P. The piezoelectric element of the ultrasonic wave receiver 107b causes, in accordance with the basis weight, the electrode terminal to apply an output voltage that corresponds to the amplitude of the ultrasonic waves that are received. The CPU 3 determines the basis weight of the recording material P on the basis of the peak value of the applied output voltage. For example, when the recording material P has a light basis weight, the peak value is large, and, when the recording material P has a heavy basis weight, the peak value is small.

The image formation controller 2 identifies the kind of the recording material P from the detection results of the detector of the surface properties and the detector of the basis weight and sets image formation conditions for the recording material P. The image formation conditions include change in the speed at which the recording material P is to be conveyed, change in the voltage that is to be applied to the secondary transfer roller 91 during transfer, change in the temperature at which the fixing unit 20 heats the recording material P, and change in the voltage that the fixing unit 20 applies, in accordance with the kind of the recording material P.

According to the present embodiment, the detector of the surface properties and the detector of the basis weight detect the surface properties and basis weight of recording material P to identify the kind of the recording material P as described above. However, either the detector of the surface properties or the detector of the basis weight suffices. Other characteristics of the recording material P other than the surface properties and basis weight of the recording material P may be detected. For example, the secondary-transfer-side sensor holder 324 may include a light-emitting element that emits light, the sensor holder 304 may include a light-receiving element that receives transmitted light that has been transmitted through the recording material P, and the thickness of the recording material. P may be detected from the amount of the light that has been transmitted through the recording material P. In this case, the CPU 3 determines the recording material P is thin paper when the amount of the transmitted light is large and determines the recording material. P is thick paper when the amount of the transmitted light is small.

Figure 4:
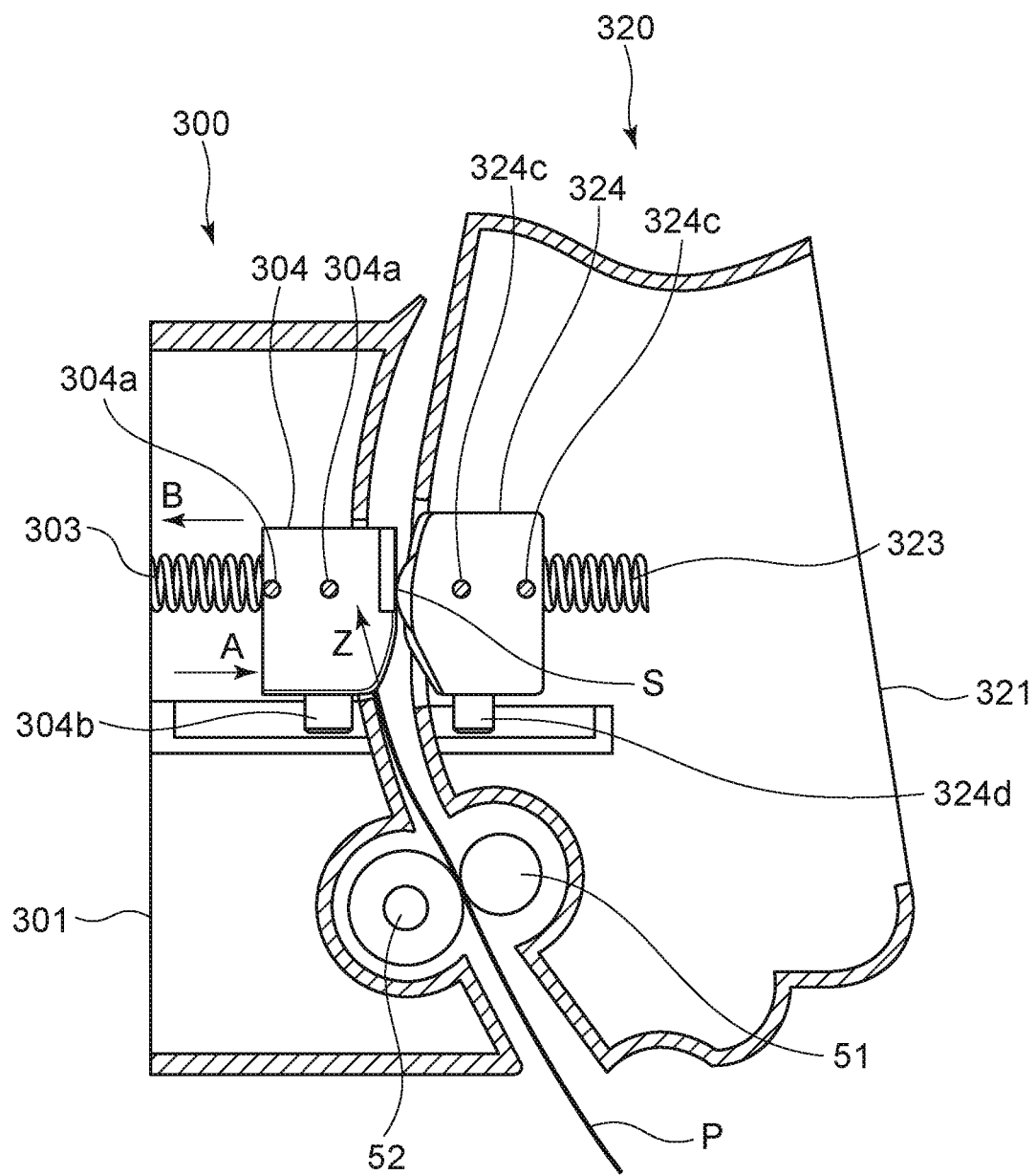
FIG. 4 illustrates units before an image is printed on a recording material that is not rigid according to the embodiment.

Description of Operation of Sensor Guide Unit and Secondary-Transfer-Side Sensor Unit FIG. 4 is a sectional view of the sensor guide unit 300 and the secondary-transfer-side sensor unit 320. As illustrated in FIG. 4, the sensor holder 304 and the secondary-transfer-side sensor holder 324 are in contact with each other, for example, at a sensor nip portion S (contact members) that is defined by the glass member 109 and the driven roller 128. The pressing force of the spring 303 and the pressing force of the spring 323 are balanced with each other in FIG. 4. A wait position is determined such that the sensor nip portion S is located on the conveyance path.

Operation when a recording material that has a light basis weight and that is not rigid, such as thin paper or recycled paper, is conveyed will now be described with reference to FIG. 4 to FIG. 6. FIG. 4 illustrates the sensor guide unit 300 and the secondary-transfer-side sensor unit 320 before the recording material P that is not rigid passes through the sensor nip portion S between the sensor holder 304 and the secondary-transfer-side sensor holder 324. In FIG. 4, the front edge of the recording material P has not yet reached the sensor nip portion S. The recording material P is conveyed by the registration roller 51 and the opposing registration roller 52 and first comes into contact with the sensor holder 304. At this time, the recording material P applies a pressing force to the sensor holder 304 in the direction of an arrow Z. The spring pressure of the spring 303 is applied to the sensor holder 304 in the direction of the arrow A. The spring pressure of the spring 323 is applied to the sensor holder 304 in the direction of the arrow B via the secondary-transfer-side sensor holder 324. The weight of the sensor holder 304 acts downward in FIG. 4. The spring pressure of the spring 303 at the wait position is equal to or more than the sum of the pressing force of the recording material P and the spring pressure of the spring 323, and accordingly, the sensor holder 304 does not move. Since the spring pressure of the spring 323 does not act in the vertical direction in FIG. 4, and the recording material P is not rigid (the basis weight is light), the recording material P slightly deforms in a conveyance area between the sensor nip portion S and a conveyance nip portion between the registration roller 51 and the opposing registration roller 52. The deformation of the recording material P results in a decrease in the pressing force of the recording material P against the sensor holder 304. Accordingly, a three that surpasses the weight of the sensor holder 304 is not produced, and the sensor holder 304 does not move in the vertical direction in FIG. 4. Consequently, the two protrusions 304a of the sensor holder 304 are not separated from the lower surface of the groove 301a of the conveyance guide 301 even when there is the clearance X between the groove 301a of the conveyance guide 301 and the two protrusions 304a of the sensor holder 304. The recording material P is conveyed to the sensor nip portion S between the sensor holder 304 and the secondary-transfer-side sensor holder 324 in this state.

Figure 5:
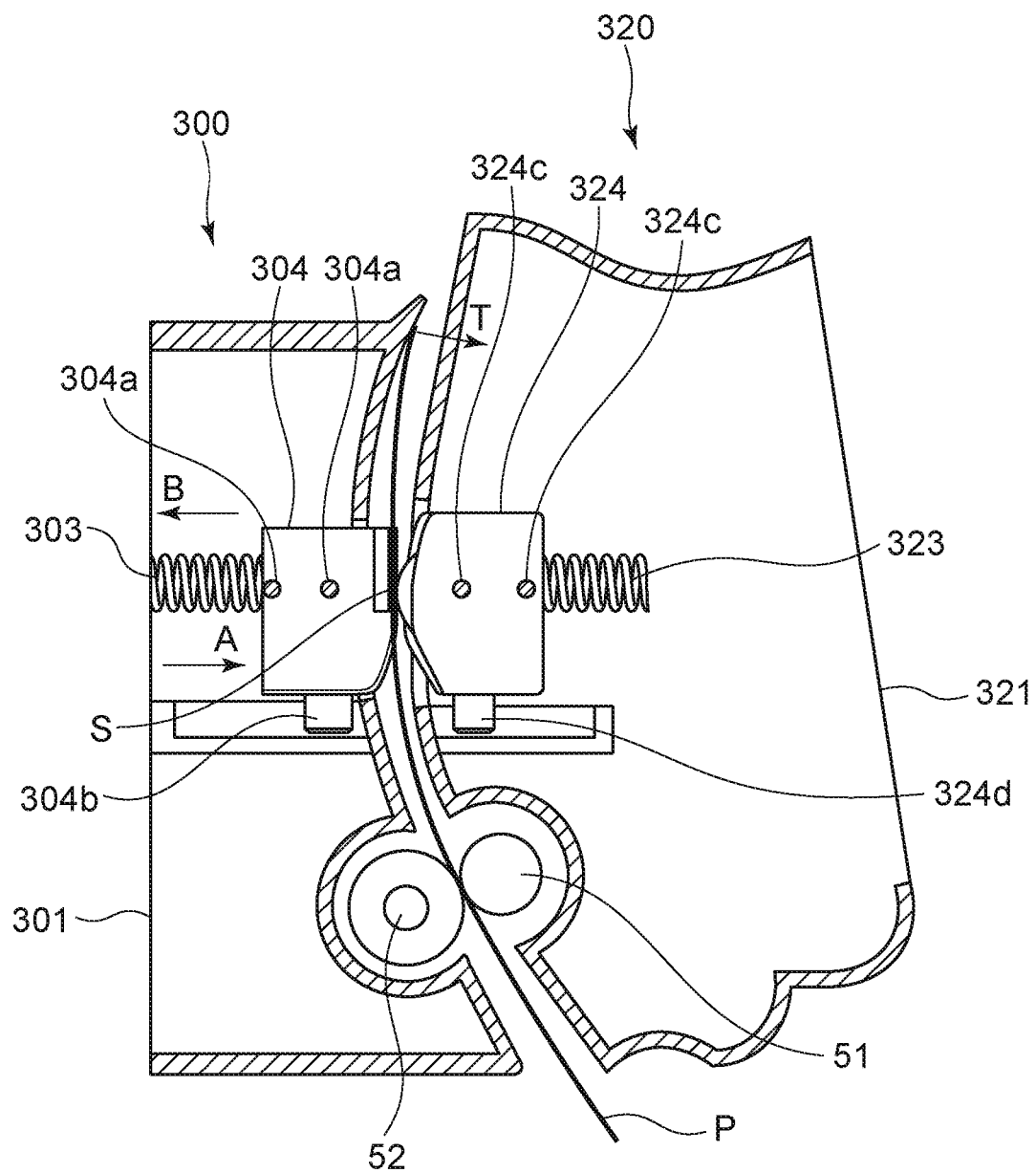
FIG. 5 illustrates the units when the recording material that is not rigid passes through contact members according to the embodiment.

FIG. 5 illustrates the sensor guide unit 300 and the secondary-transfer-side sensor unit 320 when the recording material P that is not rigid passes through the sensor nip portion S between the sensor holder 304 and the secondary-transfer-side sensor holder 324. In FIG. 5, the front edge of the recording material P has reached the sensor nip portion S. The sensor holder 304 is in contact with a surface of the recording material P. The secondary-transfer-side sensor holder 324 is in contact with the other surface of the recording material P. This enables the recording material P to be nipped. At this time, the recording material P is nipped by the glass member 109 near the sensor holder 304 and the driven roller 128 near the secondary-transfer-side sensor holder 324. When the recording material. P is conveyed beyond the sensor nip portion S between the sensor holder 304 and the secondary-transfer-side sensor holder 324, and the front edge of the recording material P comes into contact with the conveyance guide 301, the pressing force of the recording material. P is applied to the conveyance guide 301. Consequently, a reaction force from the conveyance guide 301 is applied to the recording material P in the direction of an arrow T. However, the secondary-transfer-side sensor holder 324 cannot move with the reaction force T against the recording material P that is not rigid. A frictional force that is produced at the sensor nip portion S between the sensor holder 304 and the secondary-transfer-side sensor holder 324 is small. Accordingly, the sensor holder 304 is not inclined within the clearance X. That is, the recording material P is conveyed while the original positions of the sensor holder 304 and the secondary-transfer-side sensor holder 324 are maintained.

Figure 6:
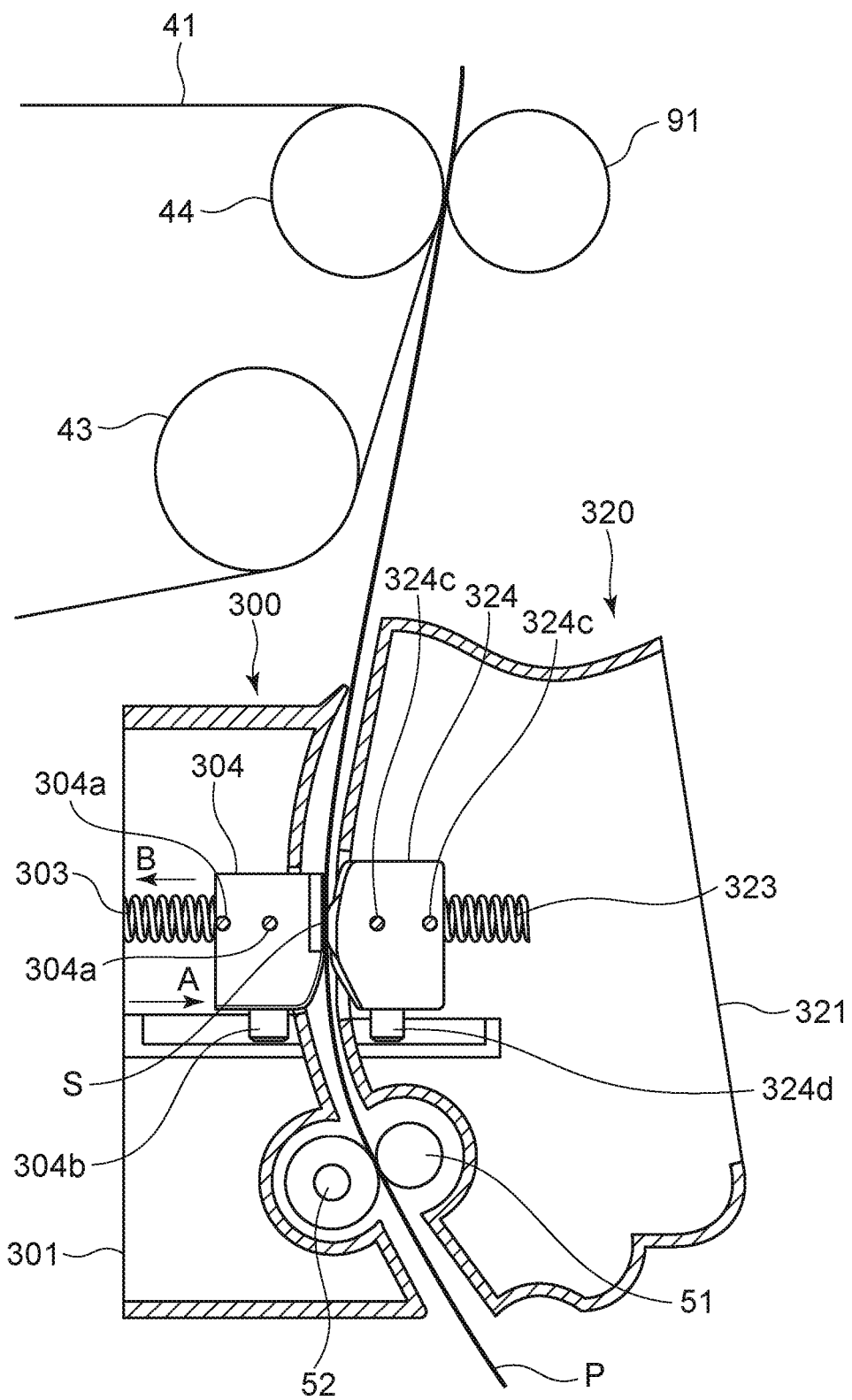
FIG. 6 illustrates the units after the recording material that is not rigid has passed through the contact members according to the embodiment.

FIG. 6 illustrates the sensor guide unit 300 and the secondary-transfer-side sensor unit 320 after a part of the recording material P that is not rigid has passed through the sensor nip portion S between the sensor holder 304 and the secondary-transfer-side sensor holder 324. In FIG. 6, the front edge of the recording material P has reached the transfer nip portion that is defined by the intermediate transfer belt 41 and the secondary transfer roller 91, and the rear edge of the recording material P has not yet passed through the conveyance nip portion that is defined by the registration roller 51 and the opposing registration roller 52. The speed at which the recording material P is conveyed at a position between the registration roller 51 and the opposing registration roller 52 differs from that at a position between the intermediate transfer belt 41 and the secondary transfer roller 91, and the difference causes the recording material P to curve. The sensor holder 304 and the secondary-transfer-side sensor holder 324 are movable in the directions of the arrows A and B while the recording material P is nipped therebetween, and the translation depends on the state of the curve of the recording material P. That is, when the degree of the curve is small, the sensor holder 304 and the secondary-transfer-side sensor holder 324 translate in the direction of the arrow A, and, when the degree of the curve is large, the sensor holder 304 and the secondary-transfer-side sensor holder 324 translate in the direction of the arrow B.

Figure 7A:
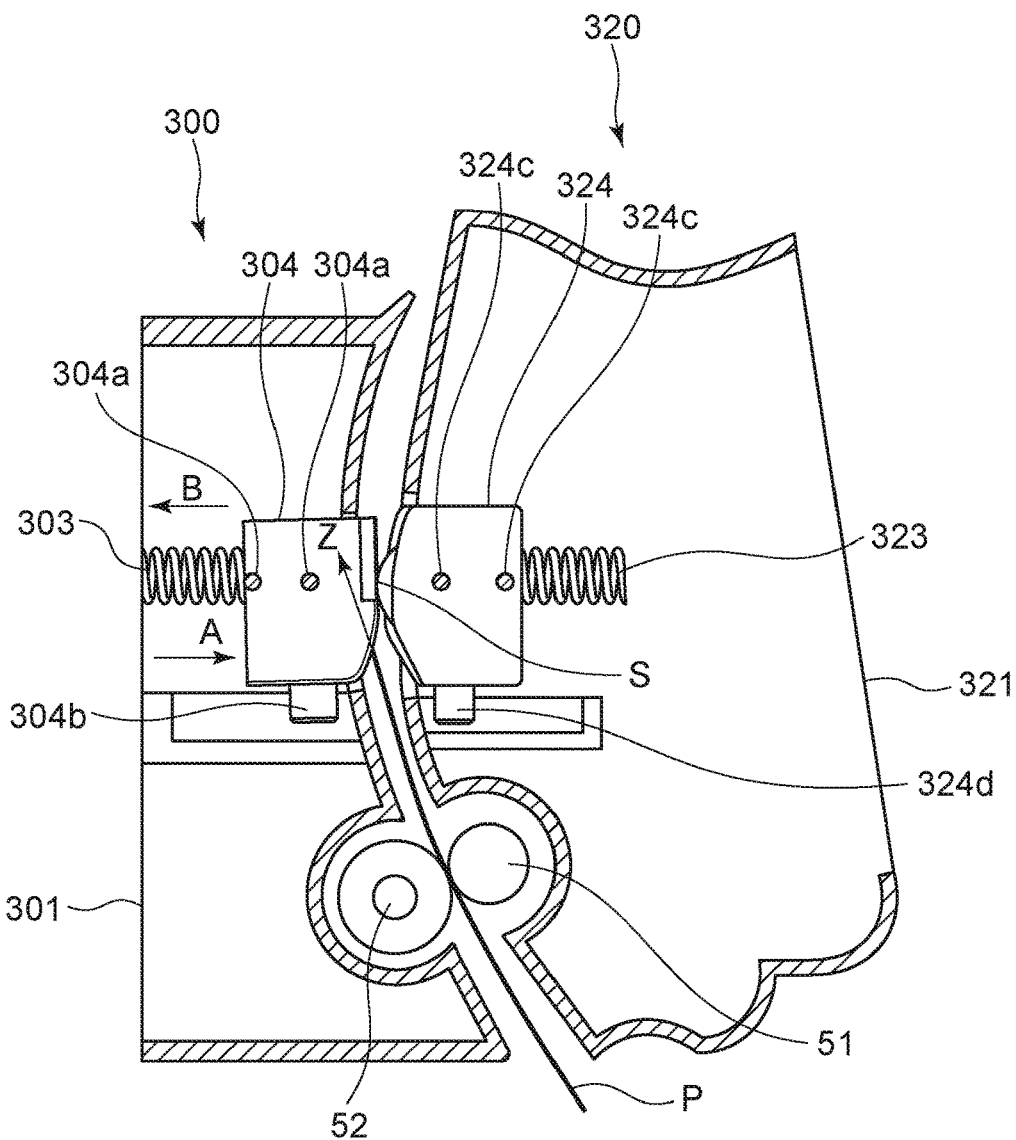
FIGS. 7A and 7B illustrate the units before a recording material that is rigid passes through the contact members according to the embodiment.
Figure 7B:
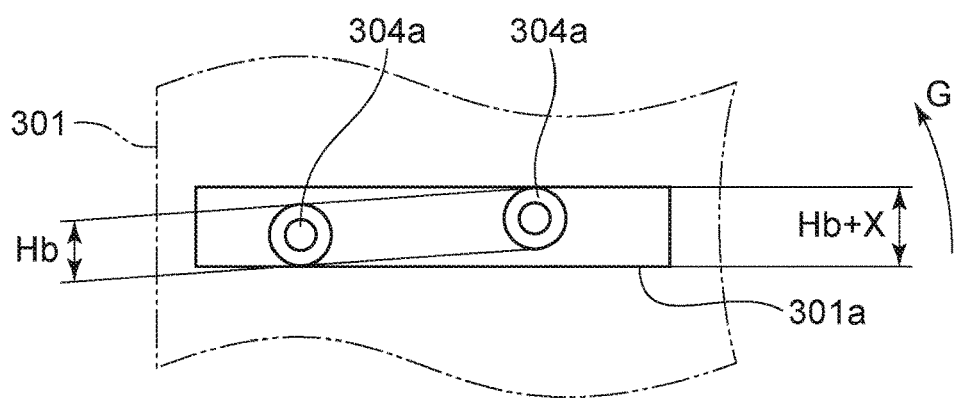

Operation when a recording material that has a heavy basis weight and that is rigid, such as thick paper or glossy paper, is conveyed will now be described with reference to FIG. 7A to FIG. 8B. FIG. 7A illustrates the sensor guide unit 300 and the secondary-transfer-side sensor unit 320 before the recording material P that is rigid passes through the sensor nip portion S between the sensor holder 304 and the secondary-transfer-side sensor holder 324. In FIG. 7A, the front edge of the recording material P has not yet reached the sensor nip portion S. The recording material P is conveyed by the registration roller 51 and the opposing registration roller 52 and first comes into contact with the sensor holder 304. At this time, the recording material P applies a pressing force to the sensor holder 304 in the direction of the arrow Z. Since the recording material P is rigid, the pressing force thereof is larger than that in the case in FIG. 4. As in the case where the recording material P is not rigid, the spring pressure of the spring 303 is applied to the sensor holder 304 in the direction of the arrow A, and the spring pressure of the spring 323 is applied to the sensor holder 304 in the direction of the arrow B via the secondary-transfer-side sensor holder 324. The weight of the sensor holder 304 acts downward in FIG. 7A. The spring pressure of the spring 303 at the wait position is less than the sum of the pressing force of the recording material P that is rigid and the spring pressure of the spring 323, and accordingly, the sensor holder 304 moves in the direction of the arrow B. In addition, the frictional force between the recording material P and the sensor holder 304 increases because the pressure at which the recording material P that is rigid is in contact with the sensor holder 304 increases. Accordingly, as illustrated in FIG. 7B, the recording material P that is rigid causes the sensor holder 304 to rotate about the protrusion 304a near the spring 303 in the direction of an arrow G.

Figure 8A:
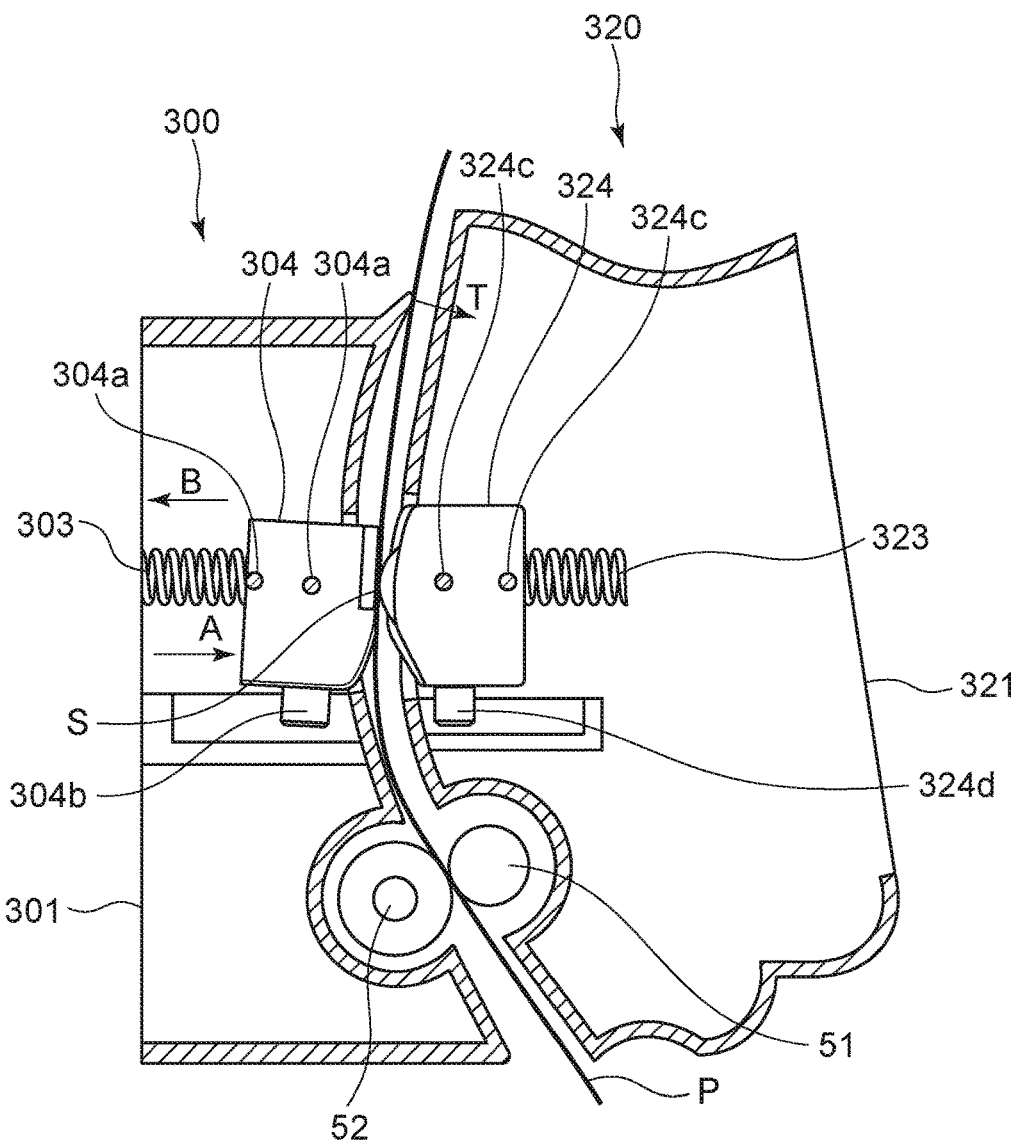
FIGS. 8A and 8B illustrate the units when the recording material that is rigid passes through the contact members according to the embodiment.
Figure 8B:
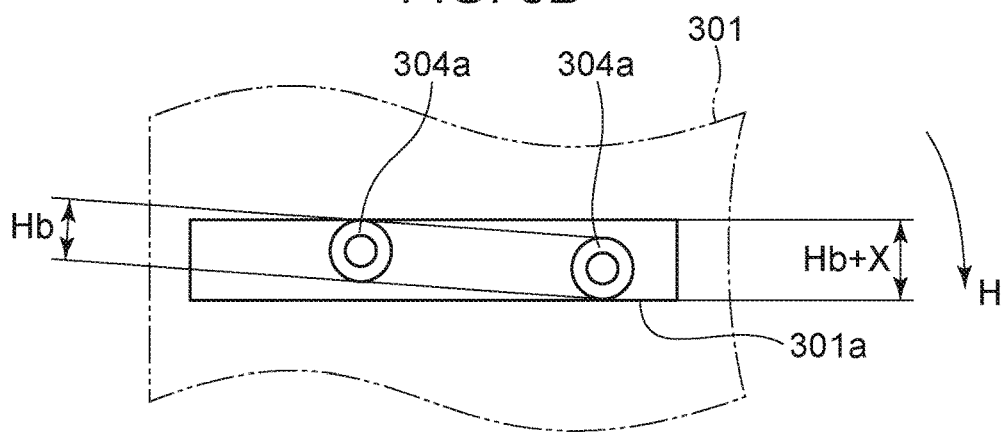

FIG. 8A illustrates the sensor guide unit 300 and the secondary-transfer-side sensor unit 320 after a part of the recording material P that is rigid has passed through the sensor nip portion S between the sensor holder 304 and the secondary-transfer-side sensor holder 324. In FIG. 8A, the front edge of the recording material P has reached the sensor nip portion S. When the recording material P is conveyed beyond the sensor nip portion S between the sensor holder 304 and the secondary-transfer-side sensor holder 324, and the front edge of the recording material P comes into contact with the conveyance guide 301, the pressing force of the recording material P is applied to the conveyance guide 301. Consequently, a reaction force from the conveyance guide 301 is applied to the recording material P in the direction of the arrow T. At this time, since the recording material P is rigid, the shape of the recording material P does not follow the shape of the conveyance path between the conveyance guide 301 and the secondary-transfer-side conveyance guide 321. The posture of the recording material P is determined by the position at which the front edge of the recording material P comes into contact with the conveyance guide 301 and the direction in which the recording material P is conveyed by the registration roller 51 and the opposing registration roller 52. At this time, the position and inclination of the sensor holder 304 depend on the movement and posture of the recording material P. The reaction force T in the case where the recording material P is rigid is larger than that in the case where the recording material P is not rigid (see FIG. 5). Accordingly, as illustrated in FIG. 8B, the recording material P that is rigid causes the sensor holder 304 to rotate about the protrusion 304a near the spring 303 in the direction of an arrow H. Through the above operation, the recording material P is successively nipped at the sensor nip portion S that is defined by the glass member 109 near the sensor holder 304 and the driven roller 128 near the secondary-transfer-side sensor holder 324 without being separated from the glass member 109.

Thus, according to the present embodiment, the sensor holder 304 and the secondary-transfer-side sensor holder 324 are movable in the directions in which the recording material P is nipped (left and right directions, or the directions of the arrows A and B in FIG. 4 to FIG. 8B). The sensor holder 304 is rotatable about an axial line that is perpendicular to the direction in which the sensor holder 304 and the secondary-transfer-side sensor holder 324 are movable and that is perpendicular to the direction (vertical direction in FIG. 4 to FIG. 8B) in which the recording material P is conveyed, that is, an axial line that extends in the width direction of the recording material P. In other words, as illustrated in FIG. 7B and FIG. 8B, the sensor holder 304 is rotatable in the directions of the arrows G and H.

Through the above operation, the recording material P is successively nipped at the sensor nip portion S that is defined by the glass member 109 near the sensor holder 304 and the driven roller 128 near the secondary-transfer-side sensor holder 324 without being separated from the glass member 109 even when the posture of the recording material P changes due to the shape of the conveyance path. The sensor holder 304 and the secondary-transfer-side sensor holder 324 can follow the posture of the recording material P while nipping the recording material P regardless of the rigidity and behavior of the recording material P, and the precision of identification of the recording material P can be inhibited from decreasing.

The sensor holder 304 and the secondary-transfer-side sensor holder 324 according to the present embodiment are rotatable not only in the directions of the arrows G and H but also in the directions of the arrows C and D. To describe the operation of the sensor holder 304 and the secondary-transfer-side sensor holder 324 below, an example is taken from the case where the recording material P is fed with the recording material P curling in the width direction (direction perpendicular to the direction in which recording material P is conveyed).

Figure 9A:
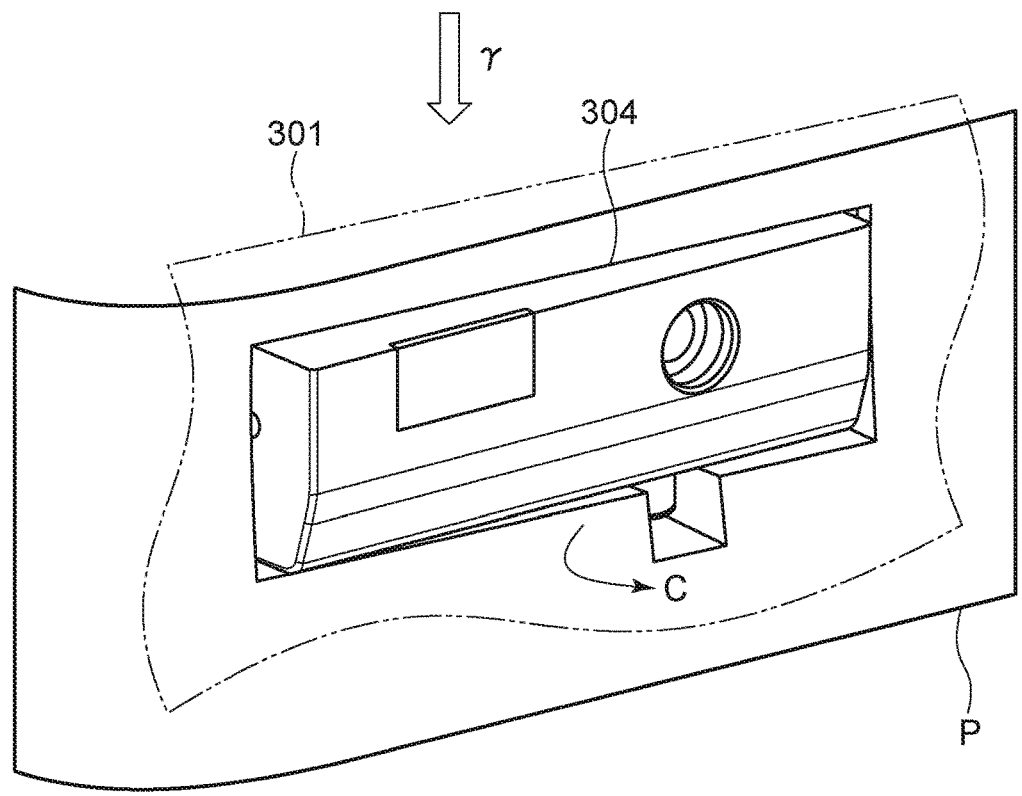
FIGS. 9A and 9B illustrate the units when a recording material that curls passes through the contact members.
Figure 9B:
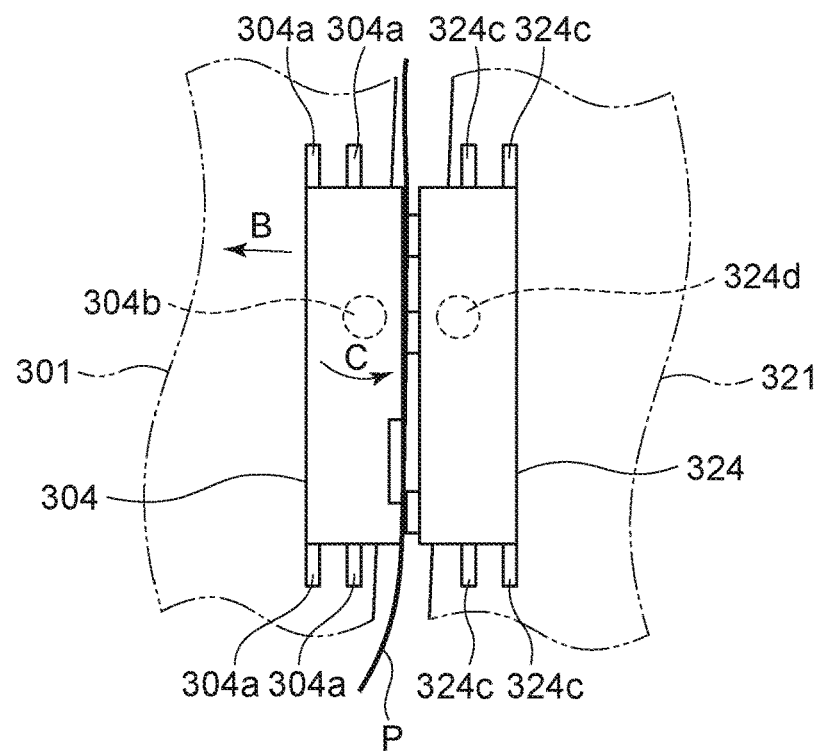

FIGS. 9A and 9B illustrate the operation of the sensor guide unit 300 and the secondary-transfer-side sensor unit 320 when the recording material P is fed with the recording material P curling in the width direction. In some cases where an image is formed on the recording material P, the recording material P curls in the width direction. in duplex printing, the recording material P needs to be conveyed again to the sensor nip portion S after an image is printed on a surface of the recording material P.

FIG. 9A illustrates the sensor holder 304 when the recording material P that curls in the width direction passes through the sensor nip portion S between the sensor holder 304 and the secondary-transfer-side sensor holder 324. Since the recording material P, which is conveyed by the registration roller 51 and the opposing registration roller 52, curls in the width direction, the distance between the recording material P and the conveyance guide 301 varies in the width direction. Accordingly, a portion of the recording material P on one side comes into contact with the sensor holder 304, and the pressing force thereof that is applied to the sensor holder 304 varies in the width direction of the recording material P.

FIG. 9B illustrates the sensor holder 304 and the secondary-transfer-side sensor holder 324 viewed from the downstream side (transfer nip portion side) in the direction in which the recording material P is conveyed. That is, FIG. 9B illustrates the sensor holder 304 and the secondary-transfer-side sensor holder 324 viewed in the direction of an arrow γ in FIG. 9A. The sensor holder 304 moves in the direction of the arrow B when the recording material P applies the pressing force that varies in the width direction to the sensor holder 304. The distance of the movement at a position at which the recording material P is separated from the conveyance guide 301 in the width direction is shorter than the distance at a position in contact with the recording material P. Accordingly, the cylindrical protrusion 304b of the sensor holder 304 rotates in the direction of the arrow C and inclines in the groove 301b of the conveyance guide 301, and the sensor holder 304 moves so as to follow the posture of the recording material P. Similarly, a reaction force that varies in the width direction of the recording material P is applied to the secondary-transfer-side sensor holder 324, and the cylindrical protrusion 324d of the secondary-transfer-side sensor holder 324 rotates and inclines in the groove 321d of the secondary-transfer-side conveyance guide. Consequently, the sensor holder 304 comes into contact with a surface of the recording material P, and the secondary-transfer-side sensor holder 324 comes into contact with the other surface of the recording material P. This enables the recording material P to be nipped.

The rotation center line of the cylindrical protrusion 304b of the sensor holder 304 passes through the center of the ultrasonic wave receiver 107b when viewed from the direction of FIG. 2D as described above. The rotation center line of the cylindrical protrusion 324d of the secondary-transfer-side sensor holder 324 passes through the center of the ultrasonic wave transmitter 127b when viewed from the direction of FIG. 3C. This inhibits the ultrasonic wave receiver 107b and the ultrasonic wave transmitter 127b from being relatively misaligned and inhibits the precision of identification with the detector of the basis weight that includes the ultrasonic wave receiver 107b and the ultrasonic wave transmitter 127b from decreasing.

Through the above operation, the recording material P is successively nipped at the sensor nip portion S that is defined by the glass member 109 near the sensor holder 304 and the driven roller 128 near the secondary-transfer-side sensor holder 324 without being separated from the glass member 109 even when the recording material P curls in the width direction. The sensor holder 304 and the secondary-transfer-side sensor holder 324 can follow the posture of the recording material P while nipping the recording material P regardless of the rigidity and behavior of the recording material P, and the precision of identification of the recording material P can be inhibited from decreasing. The rotation of the sensor in the directions of the arrows C and D enables the sensor to more successfully follow the recording material P not only when the recording material P curls in the width direction but also when the recording material P that is conveyed is long in the width direction and has a large size.

According to the present embodiment, the sensor can more successfully follow the recording material P.

Modification

Figure 10A:
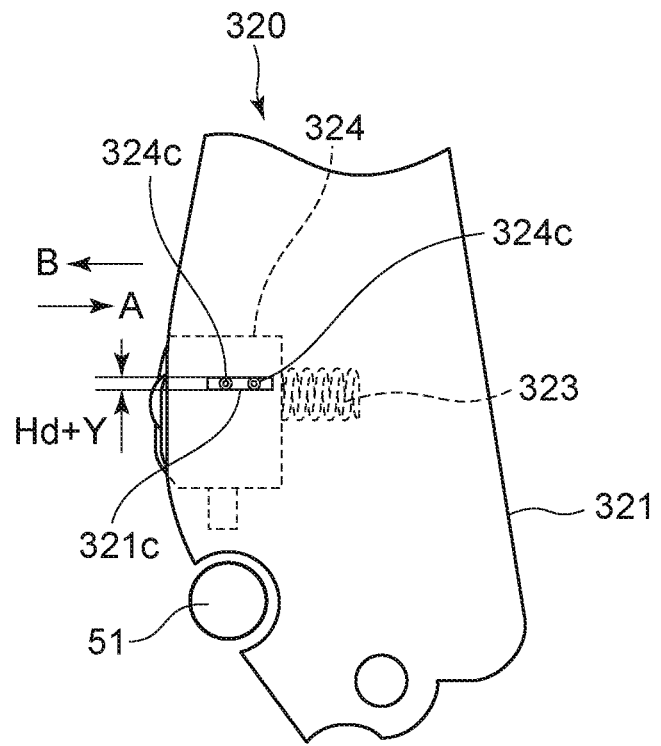
FIGS. 10A and 10B illustrate the structure of a secondary-transfer-side sensor unit according to a modification.
Figure 10B:
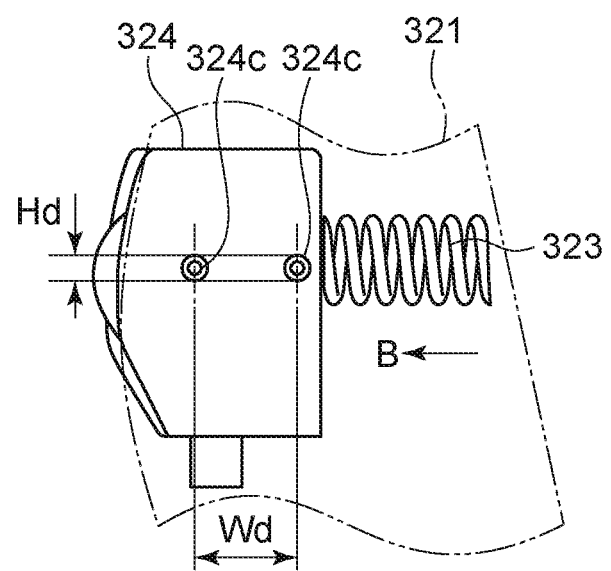

According to the present embodiment, there is substantially no clearance between the groove 321c of the secondary-transfer-side conveyance guide 321 and the protrusions 324c of the secondary-transfer-side sensor holder 324. The present invention, however, is not limited thereto. A clearance may be left such that the secondary-transfer-side sensor holder 324 can rotate and incline as with the sensor guide unit 300. This structure is illustrated in FIGS. 10A and 10B. As illustrated in FIG. 10A, the width of the groove 321c of the secondary-transfer-side conveyance guide 321 in the height direction is a clearance Y wider than the width Hd of each protrusion 324c illustrated in FIG. 10B in the height direction. The clearance Y is determined in accordance with a lateral length Wd of a space (distance) between the protrusions 324c. For example, when the lateral length Wd of the space between the protrusions 324c is 10 mm, and the clearance Y is 0.1 mm, one of the two protrusions 324c can pivot 1 degree about the other protrusion 324c within the clearance Y.

According to the present embodiment, the medium sensor that detects the characteristics of the recording material P is secured to the image-forming apparatus 1. The medium sensor, however, may be attachable to and detachable from the image-forming apparatus 1, A user can easily replace the medium sensor that is attachable thereto and detachable therefrom, for example, when the medium sensor has a malfunction. The medium sensor may be additionally mounted on the image-forming apparatus 1 with a simple structure.

According to the present embodiment, the medium sensor and the CPU 3 may be integrally formed into a recording material identification unit and may be attachable to and detachable from the image-forming apparatus 1. A user can easily interchange the medium sensor and the CPU 3 that are integrally formed and that are interchangeable with a sensor that has a new function when the function of the medium sensor is updated or a function is added thereto. The medium sensor and the CPU 3 may be integrally formed and may be additionally mounted on the image-forming apparatus 1 with a simple structure.

According to the present embodiment, the laser beam printer is described. The image-forming apparatus for which the present disclosure is used is not limited thereto and may be a printer in another printing method such as an ink-jet printer or a copying machine.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-167759 filed Aug. 31, 2017, which is hereby incorporated by reference herein in its entirety.

What is claimed is:

1. An image-forming apparatus comprising:
an image-forming unit configured to form an image on a recording material;
a detection unit configured to detect information about a characteristic of the recording material; and
a control unit configured to set an image formation condition of the image-forming unit on a basis of the information about the characteristic of the recording material that is detected by the detection unit,
wherein the detection unit includes a first contact member configured to come into contact with a surface of the recording material and a second contact member configured to come into contact with the other surface of the recording material, and the first contact member and the second contact member are configured to face each other and are capable of nipping the recording material,
wherein the first contact member and the second contact member are movable in a direction in which the first contact member and the second contact member nip the recording material, and
wherein the first contact member and the second contact member are rotatable about an axial line that extends in a direction in which the recording material is conveyed.

2. The image-forming apparatus according to claim 1,
wherein the first contact member and the second contact member are rotatable about an axial line that is perpendicular to the direction in which the first contact member and the second contact member are movable and that is perpendicular to the direction in which the recording material is conveyed.

3. The image-forming apparatus according to claim 2, further comprising:
a first holding member; and
a second holding member,
wherein the first contact member and the second contact member include respective protrusions,
wherein the first holding member is configured to hold the first contact member and includes a groove in which the protrusion of the first contact member is inserted, and the groove of the first holding member is configured to guide the protrusion of the first contact member such that the first contact member is movable, and
wherein the second holding member is configured to hold the second contact member and includes a groove in which the protrusion of the second contact member is inserted, and the groove of the second holding member is configured to guide the protrusion of the second contact member such that and the second contact member is movable.

4. The image-forming apparatus according to claim 3,
wherein the first contact member and the second contact member include respective first protrusions each of which extends in a direction that is perpendicular to the direction in which the first contact member and the second contact member are movable and that is perpendicular to the direction in which the recording material is conveyed,
wherein the first holding member includes a first groove in which the first protrusion of the first contact member is configured to be inserted, and the first groove of the first holding member is configured to guide the first protrusion of the first contact member such that the first contact member is movable, and
wherein the second holding member includes a first groove in which the first protrusion of the second contact member is configured to be inserted, and the first groove of the second holding member is configured to guide the first protrusion of the second contact member such that the second contact member is movable.

5. The image-forming apparatus according to claim 4,
wherein the first contact member includes a plurality of the first protrusions, and the second contact member includes a plurality of the first protrusions,
wherein a clearance is configured to be left between the plurality of the first protrusions of the first contact member and the first groove of the first holding member in the direction in which the recording material is conveyed, and the first contact member is rotatable about one of the plurality of the first protrusions of the first contact member, and
wherein a clearance is configured to be left between the plurality of the first protrusions of the second contact member and the first groove of the second holding member in the direction in which the recording material is conveyed, and the second contact member is rotatable about one of the plurality of the first protrusions of the second contact member.

6. The image-forming apparatus according to claim 3,
wherein the first contact member and the second contact member include respective second protrusions each of which extends in the direction in which the recording material is conveyed,
wherein the first holding member includes a second groove in which the second protrusion of the first contact member is configured to be inserted, and the second groove of the first holding member is configured to guide the second protrusion of the first contact member such that the first contact member is movable, and wherein the second holding member includes a second groove in which the second protrusion of the second contact member is configured to be inserted, and the second groove of the second holding member configured to guide the second protrusion of the second contact member such that the second contact member is movable.

7. The image-forming apparatus according to claim 6, wherein the first contact member is rotatable about the second protrusion of the first contact member, and
wherein the second contact member is rotatable about the second protrusion of the second contact member.

8. The image-forming apparatus according to claim 3, wherein a first urging member configured to urge the first contact member against the second contact member, and disposed between the first contact member and the first holding member, and
wherein a second urging member configured to urge the second contact member against the first contact member, and disposed between the second contact member and the second holding member.

9. The image-forming apparatus according to claim 1, wherein either the first contact member or the second contact member of the detection unit includes an ultrasonic wave transmitter, and the other includes an ultrasonic wave receiver,
wherein an ultrasonic wave that is transmitted by the ultrasonic wave transmitter passes through the recording material and is received by the ultrasonic wave receiver, and
wherein the control unit is configured to set the image formation condition on a basis of an amplitude of the ultrasonic wave that is received by the ultrasonic wave receiver.

10. The image-forming apparatus according to claim 1, wherein either the first contact member or the second contact member of the detection unit includes a light-emitting portion, and the other includes a light-receiving portion,
wherein light that is emitted from the light-emitting portion passes through the recording material and is received by the light-receiving portion, and
wherein the control unit is configured to set the image formation condition on a basis of transmitted light that is received by the light-receiving portion.

11. The image-forming apparatus according to claim 1, wherein either the first contact member or the second contact member of the detection unit includes a light-emitting portion and a light-receiving portion,
wherein light that is emitted from the light-emitting portion is reflected from the corresponding surface of the recording material and received by the light-receiving portion, and
wherein the control unit is configured to set the image formation condition on a basis of reflected light that is received by the light-receiving portion.

12. The image-forming apparatus according to claim 1, wherein the image formation condition is a speed at which the recording material is to be conveyed, or a voltage that is to be applied to a transfer portion that is included in the image-forming unit, or a temperature at which a fixing portion that is included in the image-forming unit fixes the image to the recording material.

13. A recording material identification unit comprising:
a detection unit configured to detect information about a characteristic of a recording material; and
a control unit configured to identify a kind of the recording material on a basis of the information about the characteristic of the recording material that is detected by the detection unit,
wherein the detection unit includes a first contact member configured to come into contact with a surface of the recording material and a second contact member configured to come into contact with the other surface of the recording material, and the first contact member and the second contact member are configured to face each other and are capable of nipping the recording material,
wherein the first contact member and the second contact member are movable in a direction in which the first contact member and the second contact member nip the recording material, and
wherein the first contact member and the second contact member are rotatable about an axial line that extends in a direction in which the recording material is conveyed.

14. The recording material identification unit according to claim 13,
wherein the first contact member and the second contact member are rotatable about an axial line that is perpendicular to the direction in which the first contact member and the second contact member are movable and that is perpendicular to the direction in which the recording material is conveyed.

15. The recording material identification unit according to claim 13,
wherein either the first contact member or the second contact member of the detection unit includes an ultrasonic wave transmitter, and the other includes an ultrasonic wave receiver,
wherein an ultrasonic wave that is transmitted by the ultrasonic wave transmitter passes through the recording material and is received by the ultrasonic wave receiver, and
wherein the control unit is configured to identify the kind of the recording material on a basis of an amplitude of the ultrasonic wave that is received by the ultrasonic wave receiver.

16. The recording material identification unit according to claim 13,
wherein either the first contact member or the second contact member of the detection unit includes a light-emitting portion, and the other includes a light-receiving portion,
wherein light that is emitted from the light-emitting portion passes through the recording material and is received by the light-receiving portion, and
wherein the control unit is configured to identify the kind of the recording material on a basis of transmitted light that is received by the light-receiving portion.

17. The recording material identification unit according to claim 13,
wherein either the first contact member or the second contact member of the detection unit includes a light-emitting portion and a light-receiving portion,
wherein light that is emitted from the light-emitting portion is reflected from the corresponding surface of the recording material and received by the light-receiving portion, and
wherein the control unit is configured to identify the kind of the recording material on a basis of reflected light that is received by the light-receiving portion.

18. An image-forming apparatus comprising:
a an image-forming unit configured to form an image on a recording material;
a detection unit configured to detect information about a characteristic of the recording material; and
a control unit configured to set an image formation condition of the image-forming unit on a basis of the information about the characteristic of the recording material that is detected by the detection unit,
wherein the detection unit includes a first contact member configured to come into contact with a surface of the recording material and a second contact member configured to come into contact with the other surface of the recording material, and the first contact member and the second contact member are configured to face each other and are capable of nipping the recording material, and
wherein the first contact member and the second contact member are rotatable about an axial line that extends in a direction in which the recording material is conveyed.

19. The image-forming apparatus according to claim 18, wherein the first contact member and the second contact member are rotatable about an axial line that is perpendicular to the direction in which the first contact member and the second contact member are movable and that is perpendicular to the direction in which the recording material is conveyed.

20. The image-forming apparatus according to claim 18, wherein the image formation condition is a speed at which the recording material is to be conveyed, or a voltage that is to be applied to a transfer portion that is included in the image-forming unit, or a temperature at which a fixing portion that is included in the image-forming unit fixes the image to the recording material.

* * * * *